Aug. 3, 1943.  S. R. HEMPHILL  2,325,771
THROTTLE BRAKE CONTROL MECHANISM
Filed Dec. 16, 1940  3 Sheets-Sheet 1
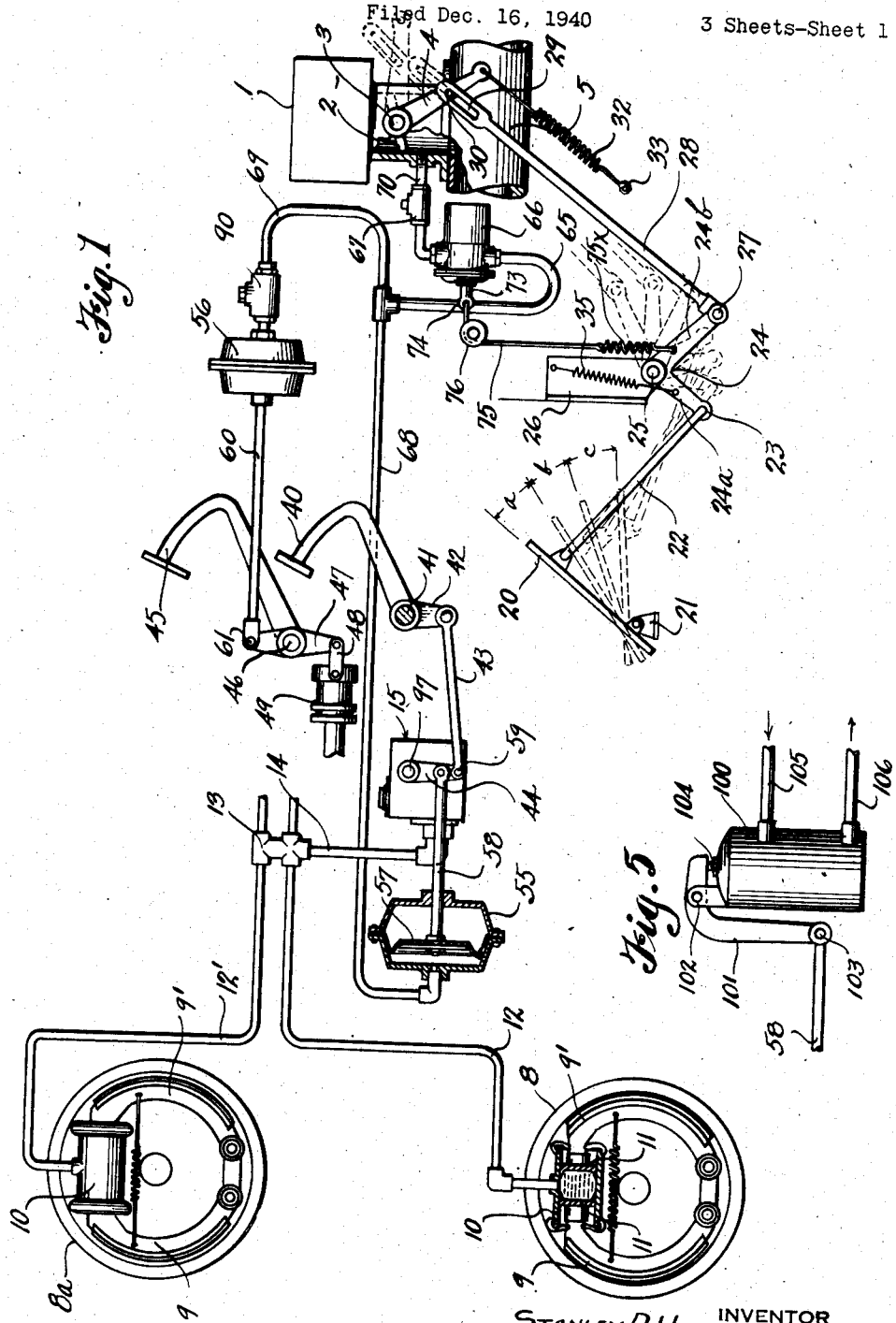
INVENTOR
STANLEY R. HEMPHILL
BY
Cook & Robinson
ATTORNEY Aug. 3, 1943.  S. R. HEMPHILL  2,325,771
THROTTLE BRAKE CONTROL MECHANISM
Filed Dec. 16, 1940  3 Sheets-Sheet 2
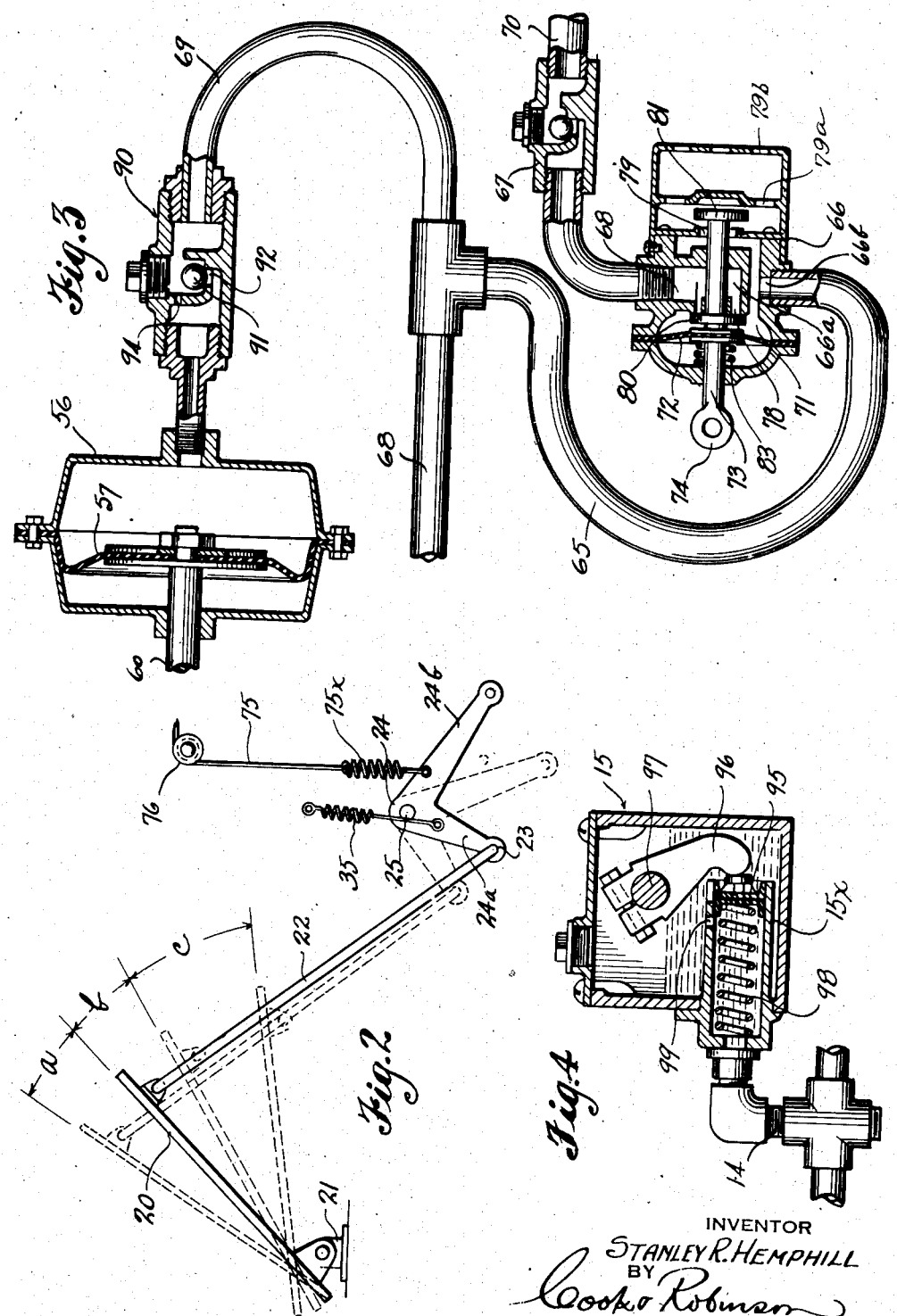
INVENTOR
STANLEY R. HEMPHILL
BY
Cook & Robinson
ATTORNEY Aug. 3, 1943.  S. R. HEMPHILL  2,325,771
THROTTLE BRAKE CONTROL MECHANISM
Filed Dec. 16, 1940  3 Sheets-Sheet 3
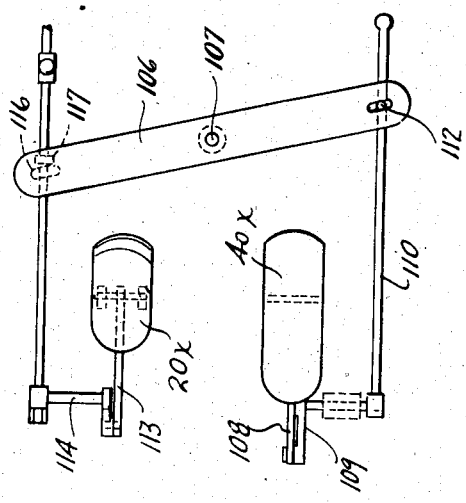
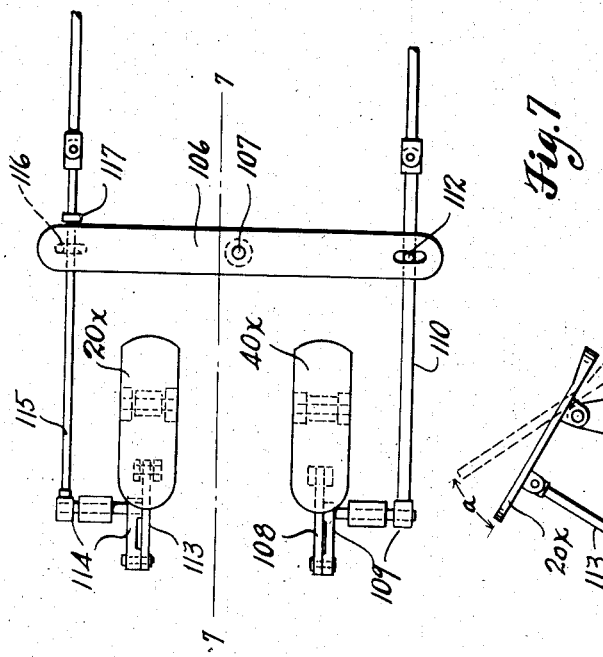
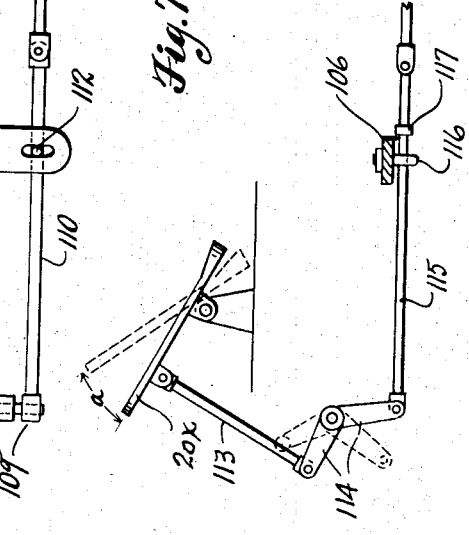
INVENTOR
STANLEY R. HEMPHILL
BY
Cook & Robinson
ATTORNEY Patented Aug. 3, 1943

2,325,771

UNITED STATES PATENT OFFICE 2,325,771

THROTTLE BRAKE CONTROL MECHANISM

Stanley R. Hemphill, Seattle, Wash.

Application December 16, 1940, Serial No. 370,380

3 Claims. (Cl. 192—3)

This invention relates to improvements in vehicle control systems and has reference more particularly to equipment for use on present-day types of automotive vehicles for the control of the braking devices.

More specifically stated, the present invention resides in the provision of a brake control system, or mechanism, for motor vehicles, which is adapted to be controlled through the mediacy of the usual foot throttle, or accelerator pedal by which the engine's speed is controlled.

Explanatory to the present invention, it will be here stated that practically all present-day motor vehicles are equipped with a standardized control system, including braking devices designed to be actuated through the mediacy of what is known as the service brake pedal, a foot throttle, or accelerator pedal for control of the engine speed, and a clutch pedal adapted to be depressed to disengage the clutch for engine idling or for the shifting of gears. The service brake pedal and the foot throttle are located adjacent each other, but it is required that the operator of the vehicle remove his foot from the foot throttle and place it on the brake pedal for actuation of the brakes, or vice versa.

Without going into a lengthy discussion of the advantages or disadvantages of engine and brake control systems of present-day motor vehicles, it is sufficient to state that many traffic accidents and many difficulties of vehicle operation can be traced directly or indirectly to the requirement that the vehicle operator move his foot from one pedal to the other in the operation and control of the vehicle; this disadvantage being particularly noted when it is required that a vehicle be stopped momentarily on a steep up grade.

In view of the above mentioned and other disadvantages to be found in present-day brake and engine control systems of motor vehicles, it has been the principal object of this invention to provide a novel combination of parts for the power braking of the vehicle, and for a control of these braking devices, as well as the clutch release mechanism, through the mediacy of the foot throttle, so that it will not be required, at any time, that the vehicle operator remove his foot from the foot throttle.

It is a still further object of the present invention to provide such an arrangement of parts for the above stated object, that the use of the foot throttle for braking or brake control, in no way interferes with its normal use for engine speed control.

Still another object of the invention resides in the provision of a brake control system of the above described character wherein the vehicle clutch will be automatically released for the shifting of gears, through the action of the foot throttle alone, thus to make it possible to shift gears without the usual depression, by the operator, of the clutch release pedal.

A still further object of the invention is to provide a brake control system of the character heretofore stated, that may be applied to present-day automotive vehicles in conjunction with the usual vehicle control devices, without requiring any material modification thereof, and providing that the vehicle may still be controlled in the usual manner if it should be so desired.

Still further objects are to be found in the details of construction of parts, in their combination and mode of operation, as will hereinafter be fully described.

In accomplishing these and other objects of the invention, I have provided the improved details of construction, the preferred forms of which are illustrated in the accompanying drawings, wherein—

Fig. 1 is a view diagrammatically illustrating the arrangement of parts embodying the present invention.

Fig. 2 is a side view of the foot throttle and its connection with a bell crank lever for carburetor and braking control; the throttle pedal being shown in dotted lines at various positions for better explanation of its functions.

Fig. 3 is a detail showing the connection of a booster cylinder as used in the present system, with a source of suction or vacuum, through the mediacy of the brake control valve. Also illustrating the use of back check valves in this connection.

Fig. 4 is a cross sectional view illustrating a type of master cylinder adapted to be used in the present braking system where a hydraulic braking medium is employed.

Fig. 5 is a detail illustrating a type of air control valve adapted for use in the present system when braking is effected through the mediacy of compressed air.

Fig. 6 is a plan, illustrating an adaptation of a modification of the present system to a pedal controlled braking system.

Fig. 7 is a section on line 7—7 in Fig. 6.

Fig. 8 is a plan view illustrating the braking operation by this mechanism.

Broadly stated, the present mechanism, or system, comprises power devices operatively connected for actuating the brakes of the vehicle, and means operable in conjunction with the foot throttle for effecting the energization or de-energization of the said power devices; the throttle being movable through an initial arc of travel for braking and clutch control, and through an additional arc of travel for engine control.

Referring more in detail to the drawings—

In Fig. 1, 1 designates what may be any of the present-day types of carburetors for supplying carbureted fuel mixture to the cylinders of an engine whereby the vehicle, which is equipped with the present control system, may be driven. This carburetor is equipped with the usual throttle valve 2 mounted by a rotatable shaft 3 to which an actuating arm, or lever 4, is fixed. The carburetor connects with a manifold designated at 5, which distributes the carbureted fuel to the engine cylinders, and it is understood that through this manifold, the suction or partial vacuum that is created by operation of the pistons in the engine cylinders, is transmitted to the outlet side of the carburetor.

It will here be mentioned that different types or kinds of power driven vehicles may be equipped with different types and kinds of engines or prime movers, and since it is not my intention that the present control system be confined to vehicles wherein the fuel supply or source of power is under the control of a carburetor, it is apparent that the lever arm 4 may be representative of the control lever of any kind or source of power. For example, it might be a control for the administration of electric power, steam power, or a hydraulic power medium, any or all of which could be applied in varying degree in accordance with movement of the lever arm.

The brake drums for a pair of wheels of the vehicle are designated at 8 and 8a and the brake shoes that are fitted thereto and which cooperate therewith for the braking operations, are designated at 9—9'; each pair of brake shoes being functionally actuated by a hydraulic jack 10 operatively connected therewith in the usual manner. In Figs. 1, I have shown the jack 10 as being mounted between the movable, or expandable ends of the paired brake shoes, and equipped, in its opposite ends, with pistons 11—11 confining a hydraulic medium between them. The hydraulic jacks for the two brakes are connected, respectively by means of pipe lines 12 and 12', with a fitting or header 13, which, in turn, has a pipe connection 14 with a master cylinder 15, later to be described in detail, through which braking pressure is applied equally to the several brake equipped wheels.

The foot throttle for engine and braking control, is designated at 20, and it comprises a pedal that is pivotally mounted at its lower end on a bracket 21, that may be fixed to the vehicle floor. A link, or rod, 22 is pivotally connected at one end with the upper end portion of the throttle pedal and, at its other end, has pivotal connection, as at 23, with the arm, 24a, of a bell crank 24.

The bell crank 24 is pivotally mounted by a stud or bolt 25 on a bracket 26 that may be fixed on the vehicle frame or dash, and it has an arm 24b extending approximately at an 80° angle to arm 24a, connected pivotally at its end, as at 27, with a link 28 that is extended to the carburetor lever arm 4. This link has a "lost motion" connection with arm 4, as noted in Fig. 1, by reason of its being provided with a longitudinal slot 29 through which a pin 30, which is fixed in the lever arm 4 extends to provide for actuation of the arm by the link.

As noted in Fig. 1, the throttle valve 3 of the carburetor is urged toward closed position at all times by the pull of a coiled spring 32 that is attached to the outer end of arm 4 and to a stud or anchor 33 that may be on the vehicle engine or on any other object that is stationary relative to the carburetor. Also, there is a coiled spring 35 attached, at one end, to the bracket 26 and at its other end to the arm 24a of bell crank 24. The disposition of the spring 35 and its direction of pull relative to the bell crank is such that at the end of a certain initial downward movement of the foot throttle, it will pass over the dead center line of the pivot stud 25 and exert a pull on the bell crank that will counteract the pull of string 32, as will later be more fully described. This initial movement of the foot throttle is that indicated by the arc $a$ in Fig. 2, and it is just sufficient that the lower end of slot 29 in link 28 will be engaged with the stud 30 and any farther movement of link 28 will cause the valve 3 to be moved toward open position.

The service brake pedal for the vehicle is designated at 40, and it is fixed to a rotatably mounted shaft 41 to which a downwardly depending lever arm 42 is fixed. A link 43 operatively connects the lower end of lever arm 42 with a control lever arm 44 on the master braking cylinder 15.

The clutch release pedal, designated at 45, is mounted on a rotatable shaft 46, equipped with a lever arm 47 having operative connection as designated by link 48 with the clutch release collar 49 of the vehicle power system.

The power devices for the mechanical operation of the brake and clutch release mechanism comprises, for the brakes, a booster cylinder 55 and for the clutch release, a booster cylinder 56. Each cylinder is of the conventional type, closed at its ends and is centrally divided between its ends by a flexible diaphragm 57. The diaphragm of cylinder 55 is operatively connected to a rod 58 which extends from the cylinder and at its outer end operatively connects, as at 59, with the master cylinder control lever 44.

Likewise, the diaphragm in booster cylinder 56 is connected with a rod 60 which extends from the cylinder and is operatively connected to a lever arm 61 on the clutch release shaft 46.

A vacuum pipe 65 connects at one end through a special brake control valve 66, and back check valve 67 with the vacuum side of carburetor 1, and at its other end, has branch pipes 68 and 69 leading therefrom respectively to the booster cylinders, 55 and 56. The arrangement is such that when valve 66 is open, vacuum is communicated through the pipe connections to the booster cylinders 55 and 56, and they are energized; the energization of cylinder 56 effecting the release of the vehicle clutch and the cylinder 55 likewise effecting an application of the braking pressure to an extent as determined by the degree of opening of valve 66.

The valve 66 is shown in cross section in Fig. 3. It comprises a valve housing equipped with a central chamber 66a with a lateral opening 66b which connects through pipe 65, back check valve 67 and a pipe 70, with the suction side of the carburetor. There is also a chamber 71 in the valve housing, divided by a flexible diaphragm 72 through which a slide valve rod 73 extends in an air-tight connection. This rod, as seen in Fig. 3, passes slidably through the opposite side walls of chamber 66a, and then continues through the opposite side walls of the chamber 71, which practically surrounds the chamber 68; one end of the rod 73 being equipped with an eyelet 74 to which one end of a pull cable 75 is attached. This cable extends over a guide roller 76 to the bell crank lever 24 where it is attached to the lever arm 24b in such manner that, through that movement of the bell crank effected by movement of the throttle pedal 20, the position of the valve rod may be controlled.

The valve chamber 66a has an opening 78 in one side wall, surrounding the rod 73 and providing communication with chamber 71, and the chamber 71 has an opening 79 to communicate with atmosphere through ports 79a and 79b. The rod 73 is equipped with valve disks 80 and 81, adapted, at different positions of the rod, to close the openings 78 and 79, respectively, and a coiled spring 83 located in chamber 71, bears against the diaphragm 72 to urge the rod 73 toward that position that valve disk 80 will close the passage 78.

When the valve 80 is closed, and valve 81 open, as seen in Fig. 3, the two booster cylinders will have connection through valve 66 to atmosphere. That is the condition so long as foot throttle 20 is depressed to engine operating speed for normal driving operations. When foot pressure is removed from the throttle pedal 20, the action of springs 32 and 35 is to return the pedal and bell crank 24 to their full line positions in Fig. 1, thus, through the pull cord 75, shifting the valve rod 73 outwardly, and opening valve 80 and closing valve 81, thus to close the connection to atmosphere and opening the suction connection between the pipe 65 and manifold, so that both booster cylinders will be energized.

The movement of valve rod 73 is rather limited; thus I find it desirable to attach cord 75 to lever 24b through the mediacy of a yieldable coiled spring 75x, as noted in Fig. 2; this spring will yield without compression of spring 83 until the foot throttle 20 starts to swing up through the braking arc, then its tension overcomes that of spring 83 and effects the opening of the valve 80.

In the pipe connection 69 leading to the booster cylinder 56, is a back check ball valve 90, as seen best in Fig. 3, in which a ball valve 90 is adapted to close against a seat surrounding a hole 92, thus to check flow of air through port 92 to the booster cylinder. However, to permit of a slow, or controlled flow of air to the booster, when valve 66 is opened to atmosphere, there is a small by-pass port 94 in the valve as will be noted by reference to Fig. 3. Thus, when the booster is de-energized, it lets the clutch back easily to avoid sudden jerk or possible damage.

The master cylinder 15 is illustrated in detail in Fig. 4, wherein it is shown as including a hydraulic cylinder 15x connected at one end to the pipe 14 and fitted with a piston 95 to be actuated inwardly by a lever arm 96 fixed on shaft 97 to which the lever 44 is secured. A coiled spring 98 in the cylinder engages the piston to move it outwardly past a port 99 in the cylinder wall, for an inflow of oil to the cylinder from housing 15. When the booster cylinder 55 is energized, the lever arm 44 is actuated to rotate shaft 97 and thus to effect an application of the vehicle brakes by reason of the piston forcing oil from the cylinder 15 into the brake lines 12 and 12'.

In the event that braking should be through air pressure instead of by use of a hydraulic medium, a control device as shown in Fig. 5 might be employed in lieu of the master cylinder 15.

This device comprises an air valve 100 having an operating lever 101 pivoted at 102. One end of the lever is operatively connected, as at 103, with the booster cylinder rod 58. The other end of the lever engages a valve stem 104 that may be depressed to open the valve to allow air under pressure to flow from a source of supply through pipe 105 to the valve and from the valve through pipe 106 to the brake actuating cylinders.

Assuming the device to be so constructed, its mode of operation is as follows:

Considering the vehicle engine to be idling, and the foot throttle 20 to be in its full line position of Fig. 1, it will be understood that a partial vacuum will be created in the manifold 5 by reason of the engine operation, and this will be transmitted through pipe 70, back check valve 67 to one side of valve 66.

With the foot throttle in this position, it will be understood that the valve 66 will be opened, that is, for transmittal of the suction or vacuum through pipe 65, and branch pipes 68 and 69, to the booster cylinders 55 and 56, to energize them to hold the brakes set and hold the clutch released.

With the clutch out, the operator first sets the transmission gears as desired, then pushes down on the foot throttle, carrying it through arc $a$ and into arc $b$. This movement of the foot throttle moves the bell crank 24, and allows the valve 66 to assume its closed position, as shown in Fig. 3, thus to cut off the effect of suction, and to open the pipe 65 to atmosphere; this being communicated to both booster cylinders so that they become de-energized, allowing the brakes to be released and the clutch to be engaged. The engine speed is then governed by the degree to which the pedal 20 is depressed.

When it is desired to stop, foot pressure is removed from the pedal 20 and it is brought back toward its full line position of Fig. 2. As it passes upwardly through the arc $b$ in Fig. 2, the slack in the pull cord 75 is taken up by the swing of the bell crank 24. This return action of the foot throttle up to arc $a$ is by reason of the pull of the spring 32 on lever arm 4. As the foot pedal moves into arc $a$, the spring 35 takes effect. The pull cord then begins to pull valve 66 open, and the effect of vacuum or suction in manifold 5 is transmitted to the booster cylinders for braking and clutch release. The degree of braking forces is determined by the extent of travel of pedal 20 up through arc $a$, and is easily controlled by the operator. When he desires to stop completely, pressure is removed from the pedal, and the spring 35 moves the valve 66 to full open position, thus applying the brakes to full extent. The brakes will be held set as long as the engine is in operation, and as long thereafter as vacuum is retained in the booster cylinders.

In Figs. 6, 7 and 8, I have illustrated an adaptation of the present throttle brake control means to a vehicle having a separate brake control pedal, such as might be employed where air brakes are in use; it being understood that in some vehicles, it is practical and has been found desirable to provide the present throttle control for direct action through the brake rod. In these views, the brake pedal is designated at 40x and the throttle pedal at 20x; each being pivotally supported for the usual foot control, as is pedal 20. Back of these pedals, a cross bar 106 is pivotally mounted on a central pivot bolt 107 for oscillating movement. The foot pedal 40x operatively connects, through a link 108, with a bell crank 109 which, in turn, connects with a horizontal rod 110 extending rearwardly to a brake control member, not herein shown, but which might be a valve, arm, lever, or the like, corresponding to lever arm 44. This rod 110 has a vertical pivot stud 112 whereby it is operatively connected to one end of the cross bar 106. Likewise, the throttle pedal 20x is connected by a link 113 with a bell crank 114 which, in turn, connects to a horizontal throttle control rod 115 that extends slidably through an eyelet formed by a U-bolt 116 that is fixed in the other end of the cross rod 106. On the rod 115 is a fixed stop 117 that is adapted to engage the eyelet when the throttle pedal 20x moves upwardly into the arc a, as seen in Fig. 7, thus to oscillate the cross bar, as illustrated in Fig. 8, to effect an application of the brakes. Normally there is free action of the throttle and brake without interference by the stop, and the action of the bar 106 by the brake pedal has no effect on the throttle pedal.

In this arrangement of parts, the braking may be done either through the manipulation of the brake pedal 40x in the normal manner, or may be done automatically by permitting the foot pedal to move upwardly through arc a; it being understood that the pedal 20x in this instance operates as does the pedal 20 of Fig. 1, to actuate the throttle control rod 115.

One of the main features of the present combination of parts as shown in Fig. 1, resides in the arrangement of the several springs in connection with the vehicle control mechanism. It will be understood that the increasing pull on the throttle arm 4, as it opens the valve 3, by reason of the spring 32, is compensated for to some extent by the spring 35 after the bell crank 24 has moved out of the braking arc. This compensating action of the spring 35 relieves the operator of much driving strain by reason of the lessened pressure on the foot throttle.

Another feature of the invention is the quick release of the clutch which is effected and the relatively slow setting of the clutch; this being accomplished through the special form of back check valve which is interposed in the vacuum or suction connection ahead of the booster cylinder 56.

While I have illustrated the present system as including means for clutch release or clutch control, it is not intended that it be confined to combinations including the clutch, since in some vehicles, for example, those employing the fluid drive, the clutch may be eliminated.

The main feature of the invention is to be found in the means for brake control of motor vehicles, whether the brakes be on the wheel or elsewhere, and whether the power be furnished by internal combustion engine or otherwise, and whether braking be effected by vacuum suction, air pressure or hydraulic medium, so long as the control thereof is effected by means substantially as shown.

In the claims which follow, the term "valve throttle lever" will be considered to identify any element corresponding to the valve lever 4, whether it be applied to the control valve of the carburetor of an internal combustion engine, or whether it be any other movable element for governing the speed of operation of the prime mover of the vehicle.

The term "engine" will be understood to designate any prime mover for a vehicle that is controlled by such a valve throttle lever.

The term "braking system" or "braking devices" will be understood to designate any type of vehicle brake, whether of the hydraulic type shown, or mechanically operated elements which might be applied to the vehicle wheels or to the power transmission shaft.

The term "foot throttle" will designate any element corresponding to the foot pedal 20, whether it be operated by the foot or otherwise.

The "braking arc" will be understood to be that movement of the foot throttle for controlling the application of the brakes, as from full "on" to "off" position, and the "driving arc" of the foot throttle will be understood to be that interval of travel which effects the movement of the throttle valve lever for the control of the engine's speed after the brakes have been released.

Having thus described my invention, what I claim as new therein and desire to secure by Letters Patent is:

1. In a vehicle of the character described, a suction energized braking system, a suction manifold, a pipe connecting the suction manifold with the braking system, a valve interposed in said pipe and adjustable for a controlled application of suction to the braking system, an engine throttle valve lever, means yieldably retaining the said throttle valve lever at its closed position, a foot pedal, a pivotally mounted bell crank lever, a link connecting the pedal and one arm of the bell crank, an operating connection between the bell crank and valve including a yieldable member, a link connecting the other arm of the bell crank and throttle valve lever, and including a lost motion connection and a spring connected with the bell crank to yieldingly urge the foot pedal to its fully lifted position; said pedal being adapted to be depressed through an initial interval of travel for actuation of the pipe valve progressively from a full open to closed position without actuation of the throttle lever due to said lost motion connection, and adapted to be actuated through an additional interval due to said yieldable member for functional actuation of the throttle control lever while the brake control valve remains closed.

2. In a vehicle control system of the character described, a throttle valve control lever, a valve closing spring acting on the lever with increased tension as the valve is opened, a foot throttle pedal having means operatively connecting it with the lever for adjustment of the valve, and a spring associated with the said means for counteracting increased tension on the valve closing spring as the valve is moved to open positions.

3. In a vehicle control system, a carburetor having a throttle valve lever, a spring connected to the lever to draw the valve to closed position and in which tension increases in accordance with the opening of the throttle valve, a foot pedal, a pivotally mounted bell crank lever, a link operatively connecting one arm of the bell crank lever with the pedal, a link operatively connecting the other arm of the bell crank with the throttle lever, and a spring connected with the bell crank that augments the pull of the first mentioned spring during an initial interval of depression of the pedal, then counteracts it during a continued depression of the pedal.

STANLEY R. HEMPHILL.